Patented Dec. 15, 1931

1,836,204

UNITED STATES PATENT OFFICE

JOHN M. TINKER, OF SOUTH MILWAUKEE, AND VERNON A. HANSEN, OF MILWAUKEE, WISCONSIN, ASSIGNORS, BY MESNE ASSIGNMENTS, TO E. I. DU PONT DE NEMOURS & COMPANY, A CORPORATION OF DELAWARE

SEPARATION OF 2-NITRONAPHTHALENE-4,8-DISULPHONIC ACID FROM ISOMERS

No Drawing.    Application filed November 3, 1930.    Serial No. 493,226.

This invention relates to nitro-naphthalene-disulphonic acids. More particularly, it deals with a process of separating 2-nitro-naphthalene-4,8-disulphonic acid from certain isomers generally formed therewith in the process of its formation.

2-nitro-naphthalene-4,8-disulphonic acid is generally prepared by sulfonating naphthalene at low temperatures under conditions mainly leading to 1–5 and 1–6 disulfo-compounds, and then nitrating the product to the mono-nitro derivative. In this process the product is invariably contaminated with various isomers arising both during the sulfonation step and during the nitration step. Chief among these are the 1,4,8-, the 1,3,8- and the 2,4,7-compounds.

In U. S. Patent No. 1,756,537 is described a method of isolating the 2,4,8-nitronaphthalene-disulphonic acid from its various isomers by converting the 2,4,8 acid into its magnesium salt and precipitating this salt in an acid medium.

We have now found that the said precipitation and separation from isomers can be effected by the use of compounds of metals belonging in the zinc-group in the well-known system of qualitative analysis comprising the successive elimination of the (1) silver group, (2) arsenic-copper group, and (3) aluminum group by the successive treatment of the unknown solution with (1) HCl, (2) $H_2S$, and (3) $NH_4OH$. (See Julius Stieglitz, "Qualitative Chemical Analysis"; published by "Century", New York, 1914; Volume II, pages 100 to 113.) This group is characterized by being soluble in $NH_4OH$, but insoluble in $(NH_4)_2S$ in alkaline solution, and consists of the elements Ni, Co, Mn, and Zn. (See Ibid, page 109, paragraph (b).)

We have found that if an acid-soluble compound of one of these elements (for instance an oxide, hydroxide, or salt) be added to the mixture of isomeric nitro-naphthalene-disulphonic acid, in acid solution the 2,4,8-isomer will be precipitated in the form of its corresponding salt leaving the other isomeric compounds in solution.

Therefore, an object of this invention is to separate 2-nitro-naphthalene, 4,8-disulphonic acid from its isomers by means of compounds of metals belonging to the zinc group of the said qualitative analysis system.

A further important object of our invention is the preparation of certain salts of 2-nitro-naphthalene, 4,8-disulphonic acid.

Other and further objects of this invention will be apparent from the disclosures in the following description, which sets forth the preferred form of our invention.

As the proportion of the 2,4,8-isomer in the reaction mass when produced by the method above described is generally known from previous experience with this method, the requisite quantity of metallic compound to be added to convert the 2,4,8-isomer into its salt, can be readily estimated. However, this estimate need not be precise, since a slight excess of metallic ion will not affect the separation, but will merely constitute a waste of the metallic compound. On the other hand, a deficiency of the metallic compound will leave some of the 2,4,8-isomer in solution. The best procedure is to add the metallic compound in small quantities until a sample of the mother liquor separately tested with a small quantity of the precipitant shows no further precipitation.

Our preferred method is to dilute the acid nitration mass to a concentration of about 10% sulfuric acid, and then add the precipitating metal in the form of an oxide, hydroxide, or a salt thereof. It is permissible, however, also to add the precipitant first and then dilute.

It will be understood of course that instead of a single metal of the group above mentioned, a mixture of two or more of these may be used. Similarly, instead of a single compound of a given metal a mixture of two or more may be used; for instance, a mixture of various oxides, or of an oxide and a hydroxide.

In our process, we may start with the isomers in the free acid form, or we may use any suitable salt thereof which is soluble in an acid medium.

We prefer to effect the addition of the metallic compound at a temperature of about 40° C., and then cool down the mixture to about 0 to 15° C. to complete the precipitation. However, the initial temperature may be varied widely, say between 0 and 100° C.

In the case of Mn, Co and Ni, we prefer to select the "-ic" salts of these metals, to avoid the possibility of reducing the nitro group. However, under careful conditions of operation, for instance when working at low temperatures, the "-ous" salts may be used without detrimental results.

To further illustrate our invention, the following specific examples are submitted, but it should be understood that our invention is not limited thereto.

Example 1

The finished nitration mass made by sulfonating 10 parts of naphthalene with 52 parts of 24% oleum at 10 to 40° C., diluting with 5 parts water then nitrating with 19.7 parts of nitric-sulfuric acid containing 25% nitric acid, 60% sulfuric acid and 15% water, is poured into a sufficient amount of water to give a solution of 180 parts by volume and a temperature of 50° C. 2.3 parts of zinc oxide are then added and the mass cooled to 10° C. After stirring for 3 to 4 hours the acid zinc salt of 2-nitro-4,8-naphthalene-disulphonic acid is filtered off. The isomeric nitro-acids in the mother liquor may be reduced to give a mixture of the amino-disulphonic acids, which may then be separated by well-known methods.

Example 2

The nitration mass made by nitrating 10 parts of 1, 5-naphthalene-disulphonic acid disodium salt in 50 parts of 95% sulfuric acid with 2.8 parts of 70% nitric acid at 10 to 40° C., is dissolved in a sufficient amount of water to give a 10% sulfuric acid solution at 30° C. 10 parts of nickel sulfate crystals with 6 mols of water are added and the mass cooled to 15° C. After stirring for several hours the 2-nitro-naphthalene-4,8-disulphonic acid crystallizes out as a nickel salt and is filtered off. The isomeric nitro acids in the mother liquor may then be neutralized with lime and then reduced to the corresponding amino-naphthalene disulfo acids.

Example 3

A solution of naphthalene-disulphonic acids is produced by disulfonation of 10 parts of naphthalene with oleum at low temperatures. The naphthalene-disulphonic acid solution is then mono-nitrated with a sulfuric-nitric acid mixture. The resulting nitro-naphthalene disulphonic acid solution is freed of excess acid by diluting with water, precipitating the excess $H_2SO_4$ with lime, and filtering off the calcium sulfate formed.

The thus neutralized solution, which constitutes the starting solution of this process, is next made acid to Congo red solution with 5 parts of sulfuric acid, 23 parts of cobaltic chloride are then added. After stirring several hours, the 2-nitro-naphthalene-4,8-disulphonic acid crystallizes out as the cobalt salt and is filtered from the other isomers in the mother liquor.

Example 4

A solution of nitronaphthalene-disulphonic acid is prepared by disulfonating 10 parts of naphthalene with oleum at low temperatures, and mono-nitrating the resulting naphthalene disulphonic acid with a sulfuric-nitric acid mixture. The solution is then diluted with water, and the excess sulfuric acid is precipitated with lime. The calcium sulfate formed is filtered off and the soluble calcium in the mother liquor is precipitated with soda ash. The resulting calcium carbonate is next filtered off and the solution is now made acid with 5 parts of hydrochloric acid to a pH value of about 1.2 to 4.6. 32 parts of manganic sulfate are then added. After standing several hours, the 2-nitro-naphthalene-4,8-disulphonic acid separates as the manganese salt and is filtered off. The isomeric nitro acids in the mother liquor may be treated as in Example 1.

This invention involves a valuable commercial process for the separation of 2-nitro-naphthalene-4,8-disulphonic acid from its isomers as well as the preparation of certain new metal salts of 2-nitro-naphthalene-4,8-disulphonic acid, which have valuable uses in the arts.

In the claims below it should be understood that by the term "naturally occurring isomers" of 2-nitro-naphthalene-4,8-disulphonic acid we mean to refer to those isomers which generally form therewith in the process of preparing the same by low temperature disulfonation and subsequent mono-nitration of naphthalene.

We are aware that numerous details of the invention may be varied through a wide range without departing from the spirit of this invention, and we do not desire limiting the patent granted other than as necessitated by the prior art.

We claim as our invention:

1. The process of separating 2-nitro-naphthalene-4,8-disulphonic acid from its naturally occurring isomers, which comprises treating a solution containing a mixture of the said acids with a metallic compound of the group consisting of zinc, manganese, cobalt and nickel.

2. The process of separating 2-nitro-naphthalene-4,8-disulphonic acid from its naturally occurring isomers, which comprises treating a solution containing a mixture of the said acids with a metallic compound of the group consisting of zinc, manganese, cobalt and nickel, and filtering off the resulting precipitated salt of the 2-nitro-naphthalene-4,8-disulphonic acid.

3. The process of separating 2-nitro-naphthalene-4,8-disulphonic acid from the mass obtained by nitration of naphthalene disulphonic acid, which comprises treating the diluted mass with a compound of a metal selected from the group consisting of zinc, manganese, cobalt and nickel.

4. In the separation of 2-nitro-naphthalene-4,8-disulphonic acid from isomeric nitronaphthalene disulphonic acids normally associated therewith, the process which comprises forming a salt of 2-nitro-naphthalene-4,8-disulphonic acid with a metal of the group consisting of zinc, manganese, cobalt and nickel and allowing said salt to crystallize from a solution having an acid reaction.

5. The process of separating 2-nitro-naphthalene-4,8-disulphonic acid from the mass obtained by nitration of naphthalene disulphonic acid, which comprises treating the diluted mass with an acid soluble metal compound, the metal of which is a member of the group consisting of zinc, manganese, cobalt and nickel, and filtering off the resulting precipitated salt of the 2-nitro-naphthalene-4,8-disulphonic acid.

6. The process of separating 2-nitro-naphthalene-4,8-disulphonic acid from isomeric nitro-naphthalene-disulphonic acids formed therewith by nitration of naphthalene disulphonic acids, which comprises reacting a solution of the nitration mass with zinc oxide and filtering off the resulting precipitated zinc salt of 2-nitro-4,8-naphthalene disulphonic acid.

7. As a new product of manufacture, a metal compound of 2-nitro-naphthalene-4,8-disulphonic acid, the metal being a member of the group consisting of zinc, manganese, cobalt and nickel.

8. As a new product of manufacture, a metallic salt of 2-nitro-naphthalene-4,8-disulphonic acid, the metal being a member of the group consisting of zinc, manganese, cobalt and nickel.

9. As a new product of manufacture, a zinc salt of 2-nitro-naphthalene-4,8-disulphonic acid.

10. The process of separating 2-nitro-naphthalene-4,8-disulphonic acid from isomeric nitro-naphthalene-disulphonic acids formed therewith by nitration of naphthalene disulphonic acids, which comprises reacting a solution of the nitration mass with a nickelic salt and filtering off the resulting precipitated nickel salt of 2-nitro-4,8-naphthalene-disulphonic acid.

11. The process of separating 2-nitro-naphthalene-4,8-disulphonic acid from isomeric nitro-naphthalene-disulphonic acids formed therewith by nitration of naphthalene disulphonic acids, which comprises reacting a solution of the nitration mass with a cobaltic salt and filtering off the resulting precipitated cobalt salt of 2-nitro-4,8-naphthalene-disulphonic acid.

12. As a new product of manufacture, a nickel salt of 2-nitro-naphthalene-4,8-disulphonic acid.

13. As a new product of manufacture, a cobalt salt of 2-nitro-naphthalene-4,8-disulphonic acid.

In testimony whereof, we have hereunto subscribed our names at Carrollville, Milwaukee County, Wisconsin.

JOHN M. TINKER.
VERNON A. HANSEN.